J. G. SCOTT.
Car-Brake.
No. 159,612                                        Patented Feb. 9, 1875.
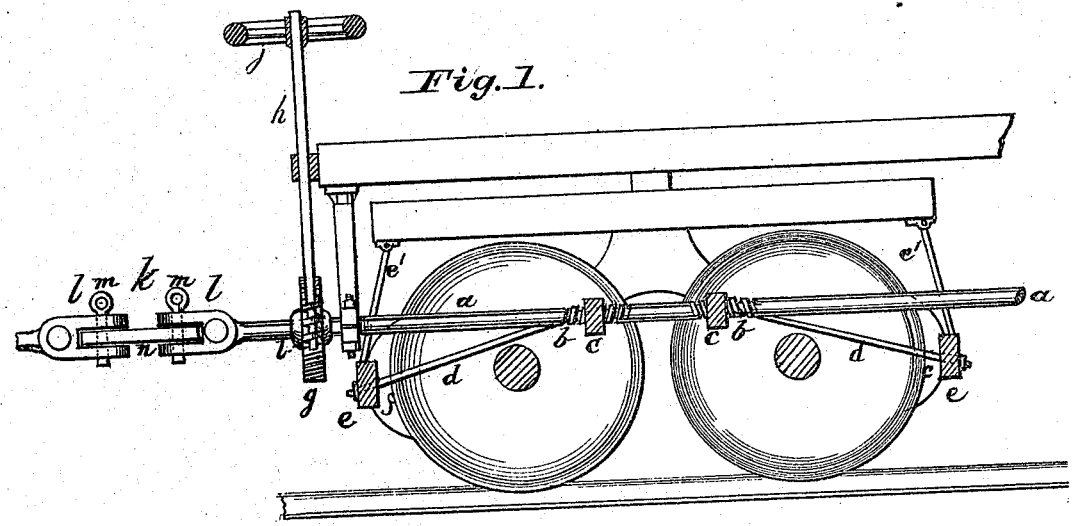
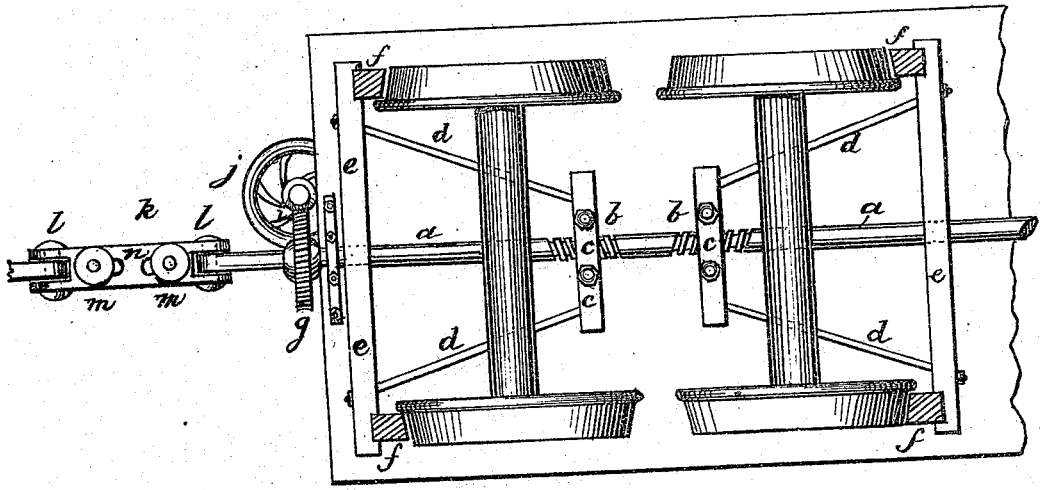

UNITED STATES PATENT OFFICE.

JAMES G. SCOTT, OF ST. THOMAS, CANADA.

IMPROVEMENT IN CAR-BRAKES.

Specification forming part of Letters Patent No. 159,612, dated February 9, 1875; application filed July 18, 1874.

*To all whom it may concern:*

Be it known that I, JAMES GEORGE SCOTT, of St. Thomas, county of Montgomery, Dominion of Canada, have invented a new Improvement in Railway-Car Brakes, of which the following is a specification:

The nature of my invention consists in adapting a right-and-left-hand screw to a shaft placed under the cars, as the compressing-power of the friction-blocks on the car-wheels, actuated by a perpendicular rod, hand-wheel, and endless screw upon a bias-cogged wheel fixed upon the shaft, the said cogged wheel and rod being so arranged as to permit of their being disengaged, when it is desired to put several brakes under the control of one man.

Figure 1 is a side view of a railway-truck embodying my improvements. Fig. 2 is a bottom view of the same.

$a\ a$, screw-shaft, placed under the cars and over the axles of the car-wheels; $b\ b$, right and left screw-threads cut on the shaft; $c\ c$, boxes, in which the screws work in contrary direction of resulting motion; $d\ d$, connecting-arms between the boxes and cross-pieces $e\ e$; $e\ e$, cross-pieces, to which are attached the friction-blocks. They are supported from the bottom of the car by hinged bars $e'\ e'$. $f f$, friction-blocks, which are pressed against or drawn from the periphery of the wheels as the screw-shaft is turned in one direction, or is reversed; $g\ g$, bias-cogged wheel, attached to the shaft $a$. $h\ h$ is a perpendicular rod, bearing on its lower extremity an endless screw-worm, $i$, engaging at will into the inclined teeth of the wheel $g\ g$.

When it is desired to give the command of all the brakes of a train to one brakeman or driver, the cogged wheels, except one, are set free either by a clutch, or by shifting the rod $h$ aside. $j\ j$, hand-wheel, fixed upon the upper end of the rod $h$.

The screw-shaft of several or of all the cars may be connected and easily separated by means of the coupling $k$, consisting of joints $l\ l$ and pins $m$, inserted in the slits and coupling-plate $n$.

Similar joints may be provided on the shaft $a$, between the trucks, so as to give sufficient pliability to allow them to adapt themselves to curves, and to lateral or other motions due to irregularities in the tracks, or in the loads of the cars.

Each car is provided with a complete set of independent brakes; but, as already stated, they can all be connected, so as to be under the command of one man.

The operation of my system is so simple that it can be understood by the mere inspection of the drawings.

I am aware that cars have been provided with a single continuous rod for braking the entire train. I do not claim it; but

What I claim as my invention is—

1. A brake composed of shaft $a\ a$, provided with right and left screw-threads $b\ b$, in boxes $c\ c$, in combination with arms $d\ d$ and cross-pieces $e\ e$, to act on friction-blocks $f f$, all constructed to operate substantially as and for the purpose set forth.

2. The shaft $a\ a$, provided at one or both ends with the double-joint coupling apparatus $m$, constructed to operate substantially as and for the purpose set forth.

J. G. SCOTT.

Witnesses:
N. AUSTIN,
L. H. BLAIS.